April 3, 1951     R. P. BLAKE     2,547,736
PROCESS FOR STRETCHING CONTINUOUS MATERIALS
SUCH AS SHEETING AND THE LIKE
Filed Aug. 8, 1947
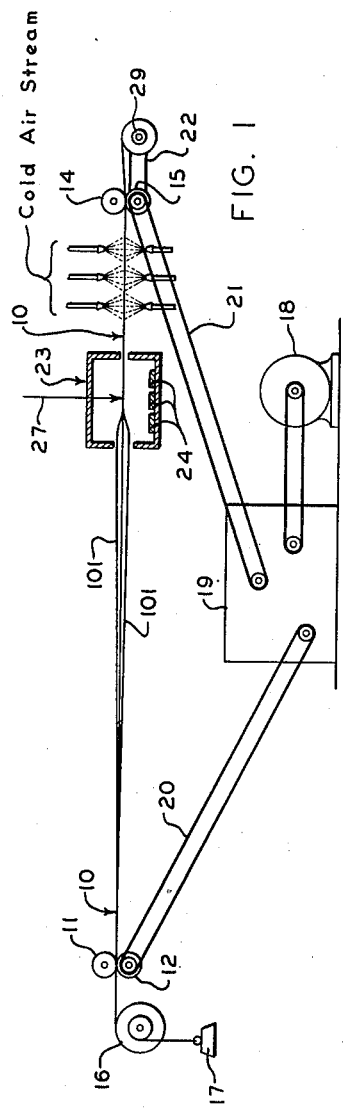
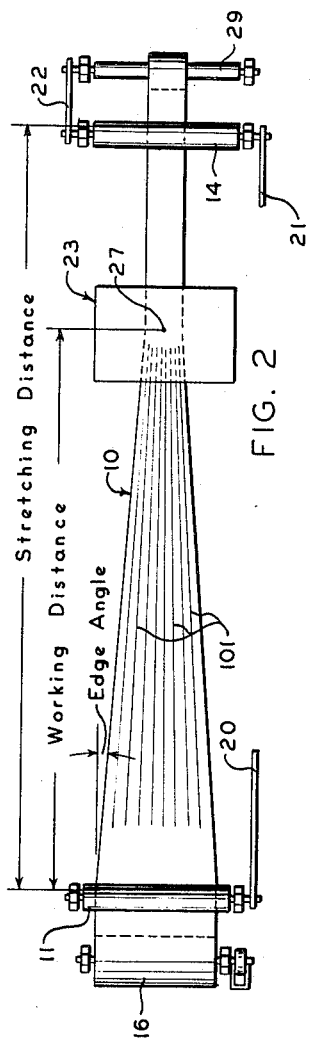
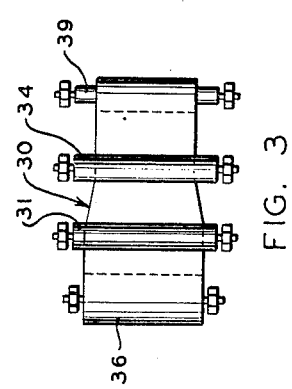

Patented Apr. 3, 1951

2,547,736

UNITED STATES PATENT OFFICE 2,547,736

PROCESS FOR STRETCHING CONTINUOUS MATERIALS SUCH AS SHEETING AND THE LIKE

Robert P. Blake, Winchester, Mass., assignor to Polaroid Corporation, Cambridge, Mass., a corporation of Delaware Application August 8, 1947, Serial No. 767,646

3 Claims. (Cl. 18—48)

This invention relates to the processing of continuous materials such as sheeting and the like and more particularly has reference to the stretching of such materials and especially to the longitudinal stretching thereof.

Objects of the invention are to provide methods for controllably stretching continuous sheet materials and the like by the continuous controlled application of opposed tensional forces which are applied to the material in a manner to permit the material to narrow substantially at will; to provide continuous methods for stretching sheet materials and the like wherein the material is stretched longitudinally of itself substantially without the application of lateral forces thereto; and to provide methods of the character described which include the softening of the material during the application of opposed tensional stretching forces and especially the softening of materials thermoplastically by the application of heat thereto.

Other objects of the invention reside in novel processing procedures for stretching continuous materials such as sheets, sheeting, webs, ribbons, films, foils, rods, filaments, and threads, and especially long-chain, linear polymeric plastic materials of this character whereby to improve and/or change or vary the physical and/or optical properties and characteristics thereof.

Still another object of this invention concerns the provision of methods for stretching continuous materials such as sheeting and the like by practices wherein the material is subjected to the action of a pair of tensional forces applied to act respectively in opposite directions and lengthwise of the material substantially uniformly thereacross whereby to stretch the material, continuously drawing and moving the material lengthwise of itself while applying the tensional stretching forces by causing one of said tensional forces to be of greater magnitude than the other, and permitting the material to narrow substantially without restraint as it is stretched by causing each of said tensional forces to be applied to act respectively and substantially along one of a pair of lines which extend across the material and which are selectively spaced apart.

Further objects of the invention reside in improved methods for softening material undergoing longitudinal stretching by the continuous application of opposed tensional forces thereto, by effecting a softening of the material as it moves between the lines of application of the opposed stretching forces to cause the material to attain a readily deformable condition, especially to attain such condition at a predetermined position in its path of travel and particularly to reach its minimum width between the lines of application of the opposed tensional forces.

Other objects of the invention will in part be obvious and will in part appear hereinafter.

The invention accordingly comprises the processes involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing wherein:

Figure 1 is a diagrammatic view in elevation, and with parts in section and parts omitted, of apparatus for carrying out the stretching practices of this invention;

Fig. 2 is a diagrammatic view in plan of the apparatus of Fig. 1 with parts thereof omitted for the purpose of simplifying the drawing; and Fig. 3 is a diagrammatic view in plan, with parts omitted, of stretching apparatus which permits different stretching practices to be carried out than those possible with the apparatus of Figs. 1 and 2, and, while not forming a part of the present invention, is useful for the purpose of illustration to assist in teaching the methods to be hereinafter set forth and claimed.

It is known that the physical properties of many solid materials may be changed by stretching such materials. With certain materials, for example plastic materials, stretching may also effect a change in the optical properties thereof. In general, plastic sheet materials are stretched to change either their physical characteristics or their optical characteristics or both. The purpose for which stretching is intended may comprise increasing the tensile strength of a sheet material or increasing its area or increasing its length or decreasing its thickness or decreasing its width or various combinations of such purposes. If sheeting has a crystalline structure, stretching may be intended to orient the molecules thereof in order to render the material birefringent. In fact, increase in the tensile strength of a material having a crystalline structure by stretching such material may be ascribed to molecular orientation. Also, stretching of sheeting which contains particles of other materials suspended therein may be employed for orienting these particles.

Stretching practices set forth herein may be utilized for the stretching of any continuous material. These practices are, however, particularly adapted and suited for the stretching of continuous plastic sheeting, which material provides an appropriate means for teaching the invention.

Plastic sheet materials which are hydrophilic as well as those which are substantially nonhydrophilic or are hydrophobic and which have long chain, substantially oriented molecules are useful for numerous purposes. For example, oriented plastic sheet materials may be employed in the formation of a variety of optical elements such as polarizers, filters, spectacle and goggle lenses, wave retardation elements and the like. In addition, birefringent and polarizing sheet materials are useful, for example, in the manufacture of automobile headlights and windshields. Also, suitable materials of this character may be used in photography in the formation of a light-polarizing sheet which serves as a support or carrier for a light-sensitive emulsion and in addition transparent, hydrophilic, molecularly oriented plastic material is well adapted for the formation or reproduction therein of light-polarizing images, designs, and the like. Besides optical and photographic use, plastic materials having the high tensile strength and pliability resulting from stretching are useful in a variety of other fields such as packaging, clothing, draperies and the like, and also in the manufacture of rope and cord suitable for a variety of purposes.

As a few examples of the many hydrophilic plastic sheet materials which may be processed by the methods hereinafter detailed, mention may be made of polyvinyl alcohol, the partially hydrolyzed polyvinyl acetals and polyvinyl alcohol esters, polyethylene, amalose, regenerated cellulose and suitably prepared polyamides or nylon-type plastics. Plastic materials of this character are high molecular weight, linear polymers which are capable of having their molecules oriented by stretching whereby these materials may be converted from an initial substantially isotropic condition to a condition wherein they display marked birefringence. Materials such as those just mentioned are characterized by their ability when in oriented condition to form a dichroic sorption complex with dichroic stains and dyes whereby the material is rendered light-polarizing.

As examples of the many nonhydrophilic or hydrophobic plastic materials which may be stretched in accordance with practices of this invention, mention may be made of cellulosic esters such as cellulose acetate and cellulose nitrate, cellulosic mixed esters such as cellulose acetate butyrate or cellulose acetate propionate, certain vinyl compounds such as the vinyl acetate chloride copolymers, certain condensation type superpolymers such as suitably prepared polyamides or nylon-type plastics, as well as many other plastics of this character. The hydrophobic plastic materials just named are also high molecular weight linear polymers and may have their molecules oriented by suitable stretching practices.

The invention generally embraces all plastic materials having the properties ascribed to the specific plastics named by way of illustration.

Stretching of materials in the form of sheets and the like is directional, and is character will be dependent upon the purposes for which the material is to be stretched. Orientation of the molecules of plastic materials occurs as an incident of the stretching of such materials. The angle between the stretch direction and the center line or longitudinal axis of continuous material, such as sheeting or the like, will determine the stretch direction. Thus, longitudinal stretch, with which this invention is solely concerned, is at 0° to the center line of the sheeting.

The terms "material such as sheeting and the like" or similar expressions are used generically to include any materials in the form of sheets, sheeting, webs, ribbons, films, foils, rods, filaments, and threads, while the term "continuous" is intended to mean relatively long unbroken or uninterrupted lengths of said material such as sheeting and the like.

Continuous longitudinal stretching apparatus as employed by the prior art comprises means for continuously applying a pair of opposed tensional forces to the material being stretched in a direction lengthwise thereof with one of these forces being of greater magnitude than the other whereby to continuously draw and move the material lengthwise of itself as it undergoes stretching or deformation. The prior art has, however, made no attempt to control the application of the opposed tensional stretching forces to the material so that the effects of lateral forces which are set up during the stretching process and which act upon the material laterally thereof are in turn controlled. Control of these lateral forces is essential to obtain desirable and predictable stretching results.

By this invention, as distinguished from the prior art, the opposed tensional stretching forces are applied in a manner so as to permit sheet or other material to narrow substantially at will as it undergoes longitudinal stretching by subjecting the material to forces which are directed longitudinally thereof substantially without the application of any lateral forces thereto. This just-described practice, in the case of a plastic material for example, permits a particular sheet material to be stretched to give substantially the highest degree of molecular orientation and birefringence obtainable for that material.

One stretching apparatus heretofore used by the prior art stretches continuous material longitudinally by continuously drawing it through two spaced-apart sets of rotating rolls, each set comprising at least two pressed-together rotatably mounted pinch or pressure rolls between which the material is gripped. The opposed tensional forces required for stretching are set up by rotating the rolls at the output end of the apparatus at a greater peripheral speed than at the input end.

Apparatus making use of spaced-apart sets of pressure rolls may be conveniently employed in carrying out the improved practices of the present invention provided a geometry of stretcher layout is employed which makes it possible to stretch material substantially without restraint upon its narrowing.

Suitable apparatus with which the methods of this invention may be practiced is illustrated in Figs. 1 and 2 wherein sheet material 10 is shown undergoing stretch processing between a set of input rolls 11 and 12 and a set of output rolls 14 and 15 arranged to provide the geometry of stretcher layout peculiar to this invention. The rolls 11 and 12 are rotatably mounted in superposed relation in a roll stand provided with conventional means for releasably holding the rolls in pressure contact. Output rolls 14 and 15 are similarly mounted. As shown in Figs. 1 and 2 the axes of the various rolls are parallel to each other in both horizontal and vertical planes. This roll arrangement, while convenient from an operational and constructional standpoint is not essential to the practice of the invention. For example, the material being stretched may be moved in other than a horizontal plane by elevating one roll set with respect to the other or the material may be moved through two or more planes by passing it partially around one or more idler rolls which are positioned between the roll sets at a position above or below the input or output rolls. Likewise, higher roll stands comprising three or more rolls may be employed.

A stock roll 16, which carries sheet material to be stretched, is mounted on the entry side of input rolls 11 and 12.

Sheet material from stock roll 16 is threaded between the input rolls 11 and 12 and the output rolls 14 and 15, preferably flat and with its longitudinal axis substantially at right angles to the roll axes. Conventional friction brake means 17 are associated with stock roll 16 for applying back tension to the sheet material. The processed material is adapted to be wound on take-up roll 29.

The input rolls 11 and 12 are rotated at a lesser peripheral speed than the output rolls 14 and 15. One roll of each roll set is driven and all other rolls in each set are mounted for free rotation. Due to the pressure contact between the rolls in each set, each freely rotatable roll will be rotated at substantially the same peripheral speed as the driven roll in that set.

Means for driving the input and output rolls may comprise an electric motor 18 or other prime mover drivably connected to the power input shaft of a gear box 19. A power take-off shaft on the gear box is drivably connected through drive chain 20 and suitable sprockets to the input roll 12. Drive chain 21 similarly connects output roll 15 to gear box 19 while chain 22 drivably connects output roll 15 to take-up roll 29. The power take-off shafts of the gear box 19 are arranged to be rotated at suitable speed differences to give a desired speed ratio for the input and output rolls.

An oven 23, provided with entry and exit ports to permit material being processed to pass therethrough, is shown in Figs. 1 and 2 located between the input and the output rolls. Oven 23 is of greater width than the unstretched material while its length will be dependent on conditions such as the speed at which the material is moved through the apparatus, whether the material is to be baked, and similar factors. Heating means comprises a series of electrical strip heaters positioned in the oven below the line of travel of the sheet material in spaced relation lengthwise of the oven and extending across the oven. Oven heat may be controlled by conventional means.

Softening of sheet material facilitates its stretching and, in the case of a thermoplastic material, softening may be ideally effected by heating. Oven 23 is illustrated as functioning for softening purposes only. Any moisture contained in a plastic material may be removed by baking after the material has been softened. For baking purposes the oven length may be increased and additional heating elements may be added thereto.

The material being stretched will reach its narrowest width or diameter at some location along its path of travel from the input rolls through the output rolls when stretched in accordance with the practices of this invention. This narrowing of width is shown in the drawing as within the softening oven 23 and is indicated by the dot 27. Under circumstances such as those illustrated where unsoftened material is softened during processing, the greatest deformation of the material undergoing stretching occurs over a relatively short region or zone which extends from the location where the material reaches its narrowest width towards the input rolls. This region may be referred to as the stretching region or zone in the practice forming the subject of illustration and in the apparatus of the drawing will lie entirely within oven 23. In instances where the sheet material or the like being processed is stretched in an unsoftened condition or is presoftened before the application of the stretching forces thereto, the stretching region or zone is not sharply defined as in cases where the material undergoes softening during stretch processing and in general is considered as extending from the input to the output rolls.

To prevent wrinkling of material which has been stretched but which is maintained in a softened condition, as by baking, it may be desirable to thread the softened material over and under a series of freely rotatable idler rolls which may be mounted in the baking zone of the oven.

Stretched sheet material in softened condition has a tendency to shrink back to less than its stretched length when it is relieved of stretching tension. It is therefore usually desirable to set or harden the stretched material. Cooling or chilling is effective for hardening stretched thermoplastic material which is in a heated condition. Considerable cooling occurs by reason of heat absorption by the output rolls. Also, the stretched material will be cooled by the surrounding atmosphere as it moves from the oven to the output rolls. If additional cooling is desirable, cold air as indicated in Fig. 1 may be directed onto the stretched material between the oven and the output rolls by means of one or more suitable air blowers or fans which, for the sake of simplicity, have been omitted from the drawing.

Under the conditions illustrated, it will be apparent that sheet material or the like undergoing stretching will be continuously subjected to a pair of opposed and unequal tensional forces each of which is developed by the spaced-apart sets of rolls. These opposed tensional forces are unequal only to the extent necessary to physically move the material between the sets of rolls. Each of these tensional forces is applied substantially uniformly across the material being stretched. In stretching operations as practiced herein, a tensional stretching force is progressively built up to reach a maximum value at some line of application which extends across the path of travel of the sheet material undergoing stretching. For example, in the case of a roll set comprising a plurality of pressed-together rolls, the magnitude of the tensional force applied by the rolls will progressively increase from the line of entry of the material into contact with the pair of rolls between which it enters the roll set to a maximum along the line of discharge where the material has its last contact with the pair of rolls from which it is discharged from the roll set. The foregoing also holds for other tension-producing devices such as those hereinafter mentioned.

In instances where added equipment is included between the stretching region and the output rolls, a slight retarding force may be applied to the sheet material as, for example, by reason of the bearing friction of oven rolls employed to carry sheet material during baking. Under these circumstances the material between the stretching region and the output rolls is under a slightly higher tension than the material between the stretching region and the input rolls. However, this effect is ordinarily so small as to be negligible. Hence, in the specification and claims, the forces which effect longitudinal stretching are considered as applied substantially only by the spaced-apart mechanical means used to develop the tensional forces needed to simultaneously move the sheeting therebetween under tension.

Consider that, on a continuous stretching machine, the volume of sheet material entering the machine per unit time must equal the volume of sheet material discharging from the machine per unit time. That is $$V_1 = V_2 \quad (1)$$

Also,
$$L_1 \times W_1 \times T_1 = V_1 \quad (2)$$

and
$$L_2 \times W_2 \times T_2 = V_2 \quad (3)$$

where V represents volume; L, length; W, width; and T, thickness; and the subscripts 1 and 2 indicate, respectively, sheet material entering the stretcher and the same sheet material as it is discharged from the machine after stretching.

The proportions between $L_1$ and $L_2$, $W_1$ and $W_2$, and $T_1$ and $T_2$ may vary quite widely depending on the layout of the stretcher. The present invention is concerned with "pure stretch," a term which is intended to comprehend the longitudinal stretching of sheet material with substantially no lateral force applied thereto during stretching, whereby the sheet material is unrestrained in narrowing and for thinning during the stretching operation. Under these conditions, $L_2 > L_1$; $W_2 < W_1$; and $T_2 < T_1$.

In pure stretch, assuming that unstretched and unoriented sheet material is being worked upon $$\frac{W_2}{W_1} = \frac{T_2}{T_1} \quad (4)$$

The ratio set forth in the above equation also assumes the absence of any lateral force applied to the sheeting as it is undergoing stretching. This ratio represents the conditions which it is endeavored to carry out in the pure stretch operations of this invention by control of the forces applied to sheet material and the like.

Comparison of pure stretch with another type of stretch which may be called "wide stretch" and which is not a part of this invention, will be useful in understanding the pure stretch practices described and claimed. In wide stretch, sheet material is intentionally restrained from narrowing during stretching by the application thereto of sufficient lateral force to maintain the width $W_2$ after stretching as closely equal as possible to the width $W_1$ before stretching. Under such circumstances, $$\frac{W_2}{W_1} \neq \frac{T_2}{T_1} \quad (5)$$

Between wide and pure stretch conditions it is possible to have an intermediate condition.

While pure stretch and wide stretch practices may be carried out with apparatus using spaced apart input and output roll sets, a device of this nature for carrying out pure stretch is characterized by great or long spacing between roll sets whereas wide stretch apparatus is characterized by small or short spacing between roll sets.

Wide stretch practices may be carried out with apparatus disclosed diagrammatically in Fig. 3 as comprising input and output roll sets 31 and 34, similar to those already described, a stock roll 36 which carries a supply of sheet material 30 illustrated as being stretch processed and a take-up roll 39 on which the stretched material is wound. The apparatus of Fig. 3 is adapted to be driven by means, not shown but similar to the drive means for the apparatus of Figs. 1 and 2. Input rolls 31 and output rolls 34 are closely spaced together as distinguished from pure stretch apparatus. Sheet softening means, not illustrated for the sake of simplicity, may be located between the input and output roll sets 31 and 34 and may comprise an oven or mechanism designed to distribute hot air over both sides of the material. The proximity of input and output roll sets 31 and 34 is limited only by the space requirements of the softening means used with the wide stretch apparatus.

Generally speaking, the degree of molecular orientation and birefringence of plastic sheet material becomes greater with increased elongation of the sheet material. Thus, the ratio of the length of the stretched sheet material to the length of the unstretched sheet material, that is $L_2/L_1$, will give some indication of degree of orientation and birefringence. However, this length ratio fails to take into account the situation wherein similar sheet materials are extended to the same length under a pure stretch condition and under a wide stretch condition so that the widths of the stretched materials are unequal.

A more conclusive expression for indicating orientation and birefringence is offered in the axial ratio which is obtained by comparing the major and minor axes of an ellipse appearing on longitudinally stretched sheet material and derived, as a result of stretching the material, from a unit circle marked on the material in its unstretched condition. The major axis of such an ellipse will lie in a direction parallel to the stretch direction and if the length of the major axis be considered as $l_2$ and that of the minor axis as $w_2$, the axial ratio will be $l_2/w_2$.

Within limits to be noted, axial ratio is directly related to birefringence and dichroism of optically active stretched material and offers an acceptably accurate measurement of stretching results.

Another expression useful, in a manner which will presently appear, is the width ratio, that is the value of $W_1/W_2$.

With reference to Fig. 2, it may be observed that the edge of the sheet material after it leaves the input or slow rolls makes an angle with its center line. This angle is termed the "edge angle" and it will become apparent that its magnitude is dependent upon the narrowing of the sheet material. However, to simplify the drawing, the edge angle has been shown in Fig. 2 as the angle between the edge of the sheet material approaching and leaving the input rolls.

Sheet material as it undergoes stretching by the application of opposed tensional forces tends to reach the narrowest possible width consistent with the magnitude of the tensional forces involved and also with the physical characteristics of the material. Forces internal of the material, set up as the material is deformed, act to narrow the material. These narrowing forces are directed laterally across the material and endeavor to pull the edges thereof inwardly and towards its center. The input rolls or other tension-applying means at the input end of the apparatus set up reaction forces along the discharge line thereof which oppose the internal forces within the material tending to effect its narrowing. The reaction forces created by the input rolls or other device act laterally of the material and from the center outwardly towards each edge thereof and consequently endeavor to restrain narrowing of the sheet material or the like as it undergoes stretching. The effects of the reaction forces which restrain narrowing diminish with increase of the distance from their position or line of application. By the present invention, the region of deformation or the stretching area is removed from the line of application of the lateral forces which restrain narrowing by a distance sufficient to reduce the effect of such forces on the deformation or narrowing of the material to a negligibly small amount.

The lateral forces which endeavor to restrain narrowing of the sheet material are functions of the edge angle. Reduction of the edge angle results in reducing these lateral restraining forces. In theory, if the edge angle is reduced to zero then there would be no lateral forces applied to the sheet material to restrain it from narrowing. It will be apparent from the geometry of the stretcher layout and with reference to the machine of Figs. 1 and 2 that the edge angle will be decreased upon increase in the distance between the position where the material being stretched reaches its narrowest width and the discharge line of the input rolls. In theory, if this distance were infinite, the edge angle would equal zero.

Lateral forces which endeavor to restrain narrowing of sheet material as it undergoes stretching are nonuniform in magnitude across the sheet material. Under wide stretch operations, lateral forces are deliberately applied to the sheet material to restrain it from narrowing. These lateral forces, in the case of wide stretch, will cause the axial ratio to vary across the sheet material undergoing stretching, with the magnitude of the axial ratio increasing outwardly from the center of the material to its edges. On the other hand, substantially uniform conditions will exist laterally of sheet material which is stretched by pure stretch practices so that for general purposes, the axial ratio of sheet material stretched under pure stretch conditions may be treated as $L_2/W_2$ where $L_2$ and $W_2$ are respectively the length and width of the processed or stretched sheet material as distinguished from the dimensions of the axes of an ellipse.

In pure stretch operations, sheet material begins to narrow as it leaves the input rolls and if the sheet material is stretched in an unsoftened condition, that is cold drawn, it will reach its narrowest width at its discharge between the output rolls as will also be the case when presoftened material is subjected to stretch processing.

On the other hand, sheet material in an unsoftened condition may be subjected to softening during stretching so as to cause it to reach its narowest width substantially at a predetermined location, indicated in Fig. 2 by dot 27, in its path of travel between the input and output rolls and under pure stretch conditions it will retain this narrowest width in the path of travel from said location through the output rolls. Maximum extension consistent with the stretching forces and conditions under which the sheet material is stretched occurs substantially at the location 27.

When sheet material initially in an unsoftened condition is subjected to softening during its stretch processing, the softening area of the stretching apparatus may be defined as the region or zone in the path of travel of the sheet material through the stretcher in which the sheet material is maintained in a softened condition. The location within the softening zone where the sheet material undergoing stretching becomes readily deformable may be called the release position. In general, the location of the release position and also the position wherein sheet material which is softened during processing reaches its narrowest width is controlled by the positioning of the softening zone. It should be noted that in instances where already softened sheet is subjected to stretching, the softening region would not be a part of the stretching apparatus at all and that the release position would be taken as the line of discharge from the input rolls.

In pure stretch operations longitudinal folds appear in unsoftened sheet material during the stretching process. These folds extend from near the input rolls to a position within the softening zone and are represented in Figs. 1 and 2 by lines 101. A cross section of the sheet material through folds 101 has the appearance of a continuous wave of approximately equal amplitudes and the folds become deeper with the approach of the material towards the softening zone. As the sheet material becomes increasingly softened by movement into the softening zone the folds 101 begin to flatten out and disappear as the sheet material approaches the location in its path of travel where it attains its narrowest width.

Folds 101 may be ascribed to the fact that, literally speaking, the edge of the sheet material is endeavoring to follow the shortest distance between two locations, namely, between the location of the discharge line of the input rolls and the location in the path of travel of the sheet material where it reaches its narrowest width.

It has been found that pure stretch may be substantially achieved, in the case of unplasticized and substantially unoriented or isotropic polyvinyl alcohol sheeting which has a thickness of about 0.005 inch and a width of about 2 inches in unstretched condition, by stretching practices wherein the polyvinyl alcohol sheet reaches its narrowest width in its path of travel during stretching at a distance, measured from the discharge line of the input rolls, of approximately seventy times the width of the sheet material or 140 inches. This distance may be called the working distance since it is the distance between the location 27 in the path of travel where the sheet material reaches its narrowest width and the line along which the tensional force opposed to the drawing tensional force is applied to act upon the sheet material being stretched, i. e., the line of discharge of the input rolls. On the other hand, the distance between the discharge lines of the input and output rolls may be defined as the stretching distance since it is at these locations that the opposing tensional forces are applied to act upon the material. In instances wherein already softened sheet material is stretched, or wherein sheet material is stretch processed without softening as well as under conditions of wide stretch, the working distance and the stretching distance will coincide.

With a material of greater extensibility than polyvinyl alcohol the working distance from pure stretch should be proportionally increased, and conversely a smaller working distance may be employed with a material of less extensibility than polyvinyl alcohol. However, as a general proposition and with reference to decreases in edge angle, the working distance cannot be too long. In this regard, a stretching apparatus designed to stretch material of a high extensibility under conditions of pure stretch may be employed substantially without change to stretch material of lower extensibility, and, similarly, a stretched designed to stretch material of high extensibility to high extension and axial ratio will work satisfactorily on the same material to give lower extensions and lower axial ratios.

The minimum width imparted to material by stretching is related to the working distance employed in stretching the material. Minimum width imparted to material by a continuous stretcher employing a working distance reduced below that compatible with pure stretch conditions will be greater than the minimum width obtained when a pure stretch set up is used. Hence, the positioning of the softening zone so as to create a reduced working distance can prevent the attainment of pure stretch or can upset pure stretch conditions when unsoftened material is subjected to softening during stretching.

With a stretcher layout using a working distance of 140 inches, unplasticized and substantially unoriented polyvinyl alcohol sheeting having an unstretched width of 2 inches and thickness of 0.005 inch may be readily stretched to about eight times its length to give an axial ratio of about 27 and a width ratio $W_2/W_1$ of about 0.3. It is possible to stretch polyvinyl alcohol sheet of similar character to about 9.5 times its length. At this higher stretch, an axial ratio of about 30 has been obtained. Axial ratio as an indication of the degree of orientation and of birefringence of plastic material has an upper limit which at least for unplasticized polyvinyl alcohol, occurs at about the value of 30. Use of a working distance of seventy times the width of the unstretched material may be impractical from the standpoint of available floor space when followed in connection with materials of greater than two inches in width. However, high axial ratios may be obtained even with working distances which are less than the empirical value noted.

For example, unplasticized and substantially unoriented polyvinyl alcohold sheeting having a width of 30 inches and a thickness of 0.005 inch in unstretched and unsoftened condition, has been stretched in apparatus using a working distance of 140 inches to give an axial ratio of about 24 at an elongation of about eight times its length and a width ratio of about 0.375. Furthermore, 2-inch polyvinyl alcohol sheet material of the character heretofore described has been stretched in apparatus using a working distance of 67 inches to give an axial ratio of about 23.5 at an elongation of 8. With still shorter working distances, proportionately lower axial ratios are obtained at equivalent elongations until wide stretch conditions are substantially met.

The relatively high axial ratios possible when the working distance is reduced below the empirical value of seventy times the width or diameter of the material being stretched are much higher than those obtained under wide stretch conditions. By hypothesis, in wide stretch, the width or diameter of the stretched material is to be held as closely as possible to its prestretched width. Obviously, this requirement of wide stretch leads to axial ratios roughly equivalent to the extension of the material being stretched and consequently lower axial ratios than the maximum value obtainable by pure stretch practices. For example, using the same material, an axial ratio of about 9 has been obtained under wide stretch conditions as compared to an axial ratio of about 30 with conditions of pure stretch. Polyvinyl alcohol of the character heretofore mentioned when processed under pure stretch conditions at the specific working distances heretofore specified has been stretched to give width ratios of from 0.3 to 0.4, while a width ratio of as high as 0.94 has been obtained by wide stretch processing.

Stretcher design will be dependent on an interbalancing of various related factors. For example, the stretching of polyvinyl alcohol sheeting of the character described has been effected with stretching temperatures between 200° F. and 400° F. dependent on the width and thickness of the material, the oven length, the speed of movement of the material, and the like. Thus, a fast stretcher will require a longer oven than a stretcher wherein the material is moved more slowly. Also, thicker sheet requires higher stretching temperatures or a longer oven, or both, and may require an increased number of rolls in the roll stands, while high elongations require high stretching temperatures, and so on.

While pressed together rotating rolls are an excellent means for applying the opposed tensional stretching forces, other mechanical expedients fall within the scope of the invention. For example, the input roll stand can be dispensed with and the stock roll may be suitably braked whereby to exert a drag upon the material as it is drawn through the output roll stand.

Further, roll stands of Figs. 1 and 2 may be converted to a friction drive type of device by maintaining the rolls out of contact with each other and by partially passing the material around each roll. In this arrangement, if a sufficient number of rolls is employed, sufficient frictional contact is provided to develop the desired tensional stretching force. As a variation, another type of friction drive spaces the rolls in a stand from each other and arranges them in a group or cluster with their axes parallel to each other but not lying in the same plane.

In addition, a stretching force may be applied by sprockets adapted to engage sprocket holes formed in the edges of the sheet material to be stretched. It is also possible to employ two pressed together flat surfaces for developing the stretching force opposed to the drawing tensional force. An equivalent of this latter expedient would be provided by locking the input rolls against rotation while maintaining them in pressure contact and drawing the material between them.

Swelling by the use of swelling agents and solvents and heating are the general methods employed for softening plastic sheet materials.

Swelling during stretching may be carried out by passing the material through a suitable liquid in a tank located between the input and output rolls. An aqueous solution of a suitable salt, i. e., sodium chloride or sodium sulfate, are examples of swelling agents for polyvinyl alcohol. Mention may be made of ethyl acetate for swelling cellulose acetate. The agent or solvent employed for softening may be removed after stretching by washing, or the material may be dried.

Softening by the use of heat is the most usual procedure and besides the use of hot air may be carried out by passing the material through a hot liquid which is substantially inert thereto, by exposing the material to infrared or to radio-frequency radiation, and in the case of materials which are electrical conductors, by induction.

While axial ratios greater than 30 are obtainable for unplasticized material, generally speaking they are possible only when the material has been softened sufficiently so that it reaches a condition generally termed "thermoplastic" wherein it is subject to flow and becomes permanently deformed when stretched. However, when a material is stretched in a condition wherein it is softer than the preferred state, it has been found that increased birefringence and orientation of the molecules are substantially negligible. It is believed to be for this reason that axial ratios of about 30 indicate the optimum birefringence and orientation obtainable for unplasticized polyvinyl alcohol. Since polyvinyl alcohol is representative of plastic materials now known to have the highest degree of extensibility, an axial ratio of 30, at least at the present time, may generally be treated as indicative of a state of maximum birefringence and orientation for any unplasticized material.

Addition of a plasticizer to a plastic material may be suitably utilized to increase the extensibility of the material. Throughout the specification, discussions concerning the extensibility of the material and reference to related properties and factors dependent upon extensibility have, however, been limited to unplasticized materials. Hence, it will be appreciated that when dealing with plasticized materials stretching results will be varied from those specifically noted.

It has been indicated that sheet material is preferably stretched in a flat or spread out condition and moved under stretching forces so that its longitudinal axis is substantially at right angles to the input and output rolls. While such practice is preferred it will be appreciated that stretching will occur by the processes heretofore set forth even though the sheet material is not maintained in a flat condition and even though it may be folded, wrinkled or creased and that the concept of the invention is satisfied since stretching is effected.

Substantially all sheet materials, webs, ribbons, films, foils, rods, filaments, threads, and the like possess some extensibility. While the amount by which such materials may be extended is increased when they are in a softened condition, it is to be understood that the practices of the present invention are intended to cover operations wherein stretching is effected without softening.

Since certain changes may be made in the above processes without departing from the scope of the invention herein involved, it is intended that all matter contained in the above description or shown in the accompanying drawing shall be interpreted as illustrative and not in a limiting sense.

What is claimed is:

1. A method of stretching continuous material such as extensible organic plastic sheeting and the like while permitting unrestrained narrowing of said material, comprising continuously subjecting said material to the simultaneous action of a pair of tensional forces which act lengthwise of the material whereby to stretch the material, continuously drawing and moving the material lengthwise of itself along a selected path while it undergoes stretching by causing one of said tensional forces to be of greater magnitude than the other tensional force, and respectively applying each said tensional force to act upon said material substantially uniformly along one of a pair of lines which extend across the path of the moving material and which are positioned in spaced relation at a distance apart equal to seventy times the width dimension possessed by the material prior to said stretching whereby as said material undergoes lengthwise movement and stretching wavelike folds are formed in the material to extend longitudinally thereof from adjacent the line of application of the lesser tensional force towards the line of application of the greater tensional force.

2. A process of stretching extensible organic plastic material such as continuous sheeting and the like, comprising subjecting said material to the action of a pair of unequal and opposed tensional stretching forces to stretch the material longitudinally and move it along a path in a direction lengthwise of itself while applying said forces in spaced-apart relation at a separation of substantially seventy times the width dimension possessed by the material prior to stretching whereby wavelike folds are formed in the material to extend longitudinally of the material from adjacent the line of application of the lesser tensional force towards the line of application of the greater tensional force, the presence of said wavelike folds indicating that the material is being stretched under conditions wherein its width dimension is substantially unrestrained from diminishing, softening said folded material over a portion of its path of movement to place the material in a readily deformable condition whereby to cause said tensional stretching forces to exert their maximum stretching effect while flattening out said folds and imparting maximum extension to the material and maximum reduction to the width and thickness of the material at the location in the path of movement where the material reaches said readily deformable condition, maintaining said material under tension while hardening the material, and after hardening the material releasing the material from the action of said tensional stretching forces.

3. In a process of stretching extensible organic plastic material such as continuous sheeting and the like, wherein the material is subjected to a pair of unequal and opposed tensional stretching forces which are applied to the material in spaced relation to each other to stretch the material longitudinally and move it along a path in a direction lengthwise of itself, and wherein opposed reaction forces are created within the material which act laterally of the material from the center outwardly towards each edge of the material to restrain the material from narrowing as it undergoes stretching and which exert a restraining influence against narrowing over a zone extending from the line of application of the lesser of said tensional forces towards the line of application of the greater of said tensional forces with said restraining influence diminishing to zero as the distance from the line of application of the greater tensional force increases, the improvement which comprises applying said greater tensional force to act on said material at a location in the path of travel of the material wherein the influence of said reaction forces to restrain narrowing is at least substantially negligible whereby wavelike folds are formed in the material to extend longitudinally of the material from adjacent the line of application of the lesser tensional force towards the line of application of the greater tensional force, softening said folded material in its path of travel between the lines of application of said tensional forces over a portion of said path wherein the influence of said reaction forces which restrain narrowing is at least approaching a minimum to place the material in a readily deformable condition whereby to stretch said material when in said deformable condition and flatten out said material by removing said folds and by reducing the width of the material while increasing the length of said material, maintaining said material substantially at said altered dimensions while keeping it under tension, hardening the material while under tension, and after hardening releasing the material from the action of said tensional forces.

ROBERT P. BLAKE.

REFERENCES CITED

The following references are of record in the file of this patent:

UNITED STATES PATENTS

| Number | Name | Date |
|---|---|---|
| 2,328,843 | Osterhof | Sept. 7, 1943 |
| 2,335,190 | Minich | Nov. 23, 1943 |
| 2,373,215 | Young | Apr. 10, 1945 |

FOREIGN PATENTS

| Number | Country | Date |
|---|---|---|
| 497,788 | Great Britain | Dec. 28, 1938 |